(12) United States Patent
Lynn et al.

(10) Patent No.: US 10,923,842 B1
(45) Date of Patent: Feb. 16, 2021

(54) SYSTEMS AND METHODS FOR SIGNAL INTEGRITY INSERTION LOSS MINIMIZATION IN INPUT/OUTPUT BACKPLANES

(71) Applicant: Dell Products L.P., Round Rock, TX (US)

(72) Inventors: William E. Lynn, Round Rock, TX (US); Kevin W. Mundt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/679,867

(22) Filed: Nov. 11, 2019

(51) Int. Cl.
  *H01R 12/75* (2011.01)
  *H01R 12/58* (2011.01)
  *H01R 12/72* (2011.01)
  *H01R 12/57* (2011.01)

(52) U.S. Cl.
  CPC ............ *H01R 12/75* (2013.01); *H01R 12/57* (2013.01); *H01R 12/58* (2013.01); *H01R 12/721* (2013.01)

(58) Field of Classification Search
  None
  See application file for complete search history.

(56) References Cited

U.S. PATENT DOCUMENTS

| 5,679,018 | A  | * | 10/1997 | Lopata | H01R 12/716 |
|           |    |   |         |        | 439/260     |
| 9,640,910 | B1 | * | 5/2017  | Chien  | G06F 13/409 |
| 9,734,106 | B2 | * | 8/2017  | Kotzur | G06F 13/385 |
| 2016/0218455 | A1 | * | 7/2016 | Sayre | H01R 13/6594 |
| 2019/0103700 | A1 | * | 4/2019 | Esmaeili | H01R 12/592 |

* cited by examiner

*Primary Examiner* — Oscar C Jimenez
(74) *Attorney, Agent, or Firm* — Jackson Walker L.L.P.

(57) ABSTRACT

As cable assembly may include a cable comprising a plurality of electrically-conductive wires and a hybrid connector that terminates an end of the cable. The hybrid connector may include a receptacle comprising a plurality of receptacle pins and configured to mechanically couple to a printed circuit board and receive an electronic device in order to mechanically couple the electronic device to the receptacle and the printed circuit board and electrically couple each of a plurality of electronic device pins of the electronic device to respective ones of the plurality of receptacle pins. The hybrid connector may also include a first section that electrically couples each of the plurality of electrically-conductive wires to respective ones of the plurality of receptacle pins and a second section that electrically couples each of a plurality of electrical conduits integral to the printed circuit board to respective ones of the plurality of receptacle pins.

16 Claims, 5 Drawing Sheets

SYSTEMS AND METHODS FOR SIGNAL INTEGRITY INSERTION LOSS MINIMIZATION IN INPUT/OUTPUT BACKPLANES

TECHNICAL FIELD

The present disclosure relates in general to information handling systems, and more particularly to systems and methods for minimizing signal integrity insertion loss in an input/output backplane.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Oftentimes, information handling systems and other information handling resources (e.g., storage devices, input/output devices, and other peripheral devices) are each manufactured in a modular form factor and may be configured to be disposed in a chassis configured to receive such modular components. Such a chassis and its component modular information handling systems and information handling resources typically include various rails, carriers, and other mechanical components allowing for a person to add and remove the modular information handling systems and information handling resources from the chassis.

In an information handling system, a modular information handling resource (e.g., a hard disk drive or other storage resource) may be electrically and mechanically coupled to a circuit board via a connector. In the case of storage resources coupled to a backplane, using traditional approaches, an input/output communications channel may add significant signal loss to the channel, through a number of traces, vias, and cables making up the channel. An example of such a channel and its various sources of signal loss are shown in FIG. 1.

As shown in FIG. 1, an information handling system 100 may include a planar 101 (e.g., a motherboard) with a processor 102 mounted thereon. Information handling system 100 may also include a backplane 104 having a connector 108 (e.g., a Peripheral Component Interconnect Express (PCIe) connector) into which an input/output (I/O) device 106 (e.g., a solid state drive) may be inserted. To communicate data from processor 102 to a controller 110 (or vice versa) the data must be communicated over a channel comprising a number of traces 112 and vias 114 of planar 101, a connector 116 (e.g., a PCIe connector) of planar 101, a cable 118, a connector 120 of backplane 104, traces 122 and vias 124 of backplane 104, connector 108, and traces 126 and vias 128 of I/O device 106. Each component of the channel may contribute a signal delay and/or signal loss to the channel. While such loss and delay may be acceptable of traditional communication speeds, such signal loss and/or delay may be incompatible with the advent of increased processing and communication speeds for I/O communication.

SUMMARY

In accordance with the teachings of the present disclosure, the disadvantages and problems associated with board-to-board coupling of input/output communications channels may be reduced or eliminated.

In accordance with embodiments of the present disclosure, a cable assembly may include a cable comprising a plurality of electrically-conductive wires and a hybrid connector that terminates an end of the cable. The hybrid connector may include a receptacle comprising a plurality of receptacle pins and configured to mechanically couple to a printed circuit board and receive an electronic device in order to mechanically couple the electronic device to the receptacle and the printed circuit board and electrically couple each of a plurality of electronic device pins of the electronic device to respective ones of the plurality of receptacle pins. The hybrid connector may also include a first section that electrically couples each of the plurality of electrically-conductive wires to respective ones of the plurality of receptacle pins and a second section that electrically couples each of a plurality of electrical conduits integral to the printed circuit board to respective ones of the plurality of receptacle pins.

In accordance with these and other embodiments of the present disclosure, a printed circuit board may include a plurality of electrical conduits integral to the printed circuit board, an opening through which a connector of a cable assembly can pass to expose a receptacle of the connector to an electronic device, wherein the receptacle comprises a first section that electrically couples each of a plurality of electrically-conductive wires of the cable assembly to respective ones of a plurality of receptacle pins of the cable assembly and a second section that electrically couples each of the plurality of electrical conduits integral to the printed circuit board to respective ones of the plurality of receptacle pins. The printed circuit board may also include a mechanical retention feature configured to mechanically couple the connector to the printed circuit board to fix a position of the receptacle to allow it to receive the electronic device and an electrical interface that electrically couples the plurality of electrical conduits integral to the printed circuit board to respective ones of the plurality of receptacle pins.

In accordance with these and other embodiments of the present disclosure, an information handling system may include a printed circuit board comprising a plurality of electrical conduits integral to the printed circuit board and a cable assembly. The cable assembly may include a cable comprising a plurality of electrically-conductive wires and a hybrid connector that terminates an end of the cable. The hybrid connector may include a receptacle comprising a plurality of receptacle pins and configured to mechanically couple to the printed circuit board and receive an electronic device in order to mechanically couple the electronic device to the receptacle and the printed circuit board and electrically couple each of a plurality of electronic device pins of the electronic device to respective ones of the plurality of receptacle pins. The hybrid connector may also include a first section that electrically couples each of the plurality of electrically-conductive wires to respective ones of the plurality of receptacle pins and a second section that electrically couples each of the plurality of electrical conduits integral to the printed circuit board to respective ones of the plurality of receptacle pins.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
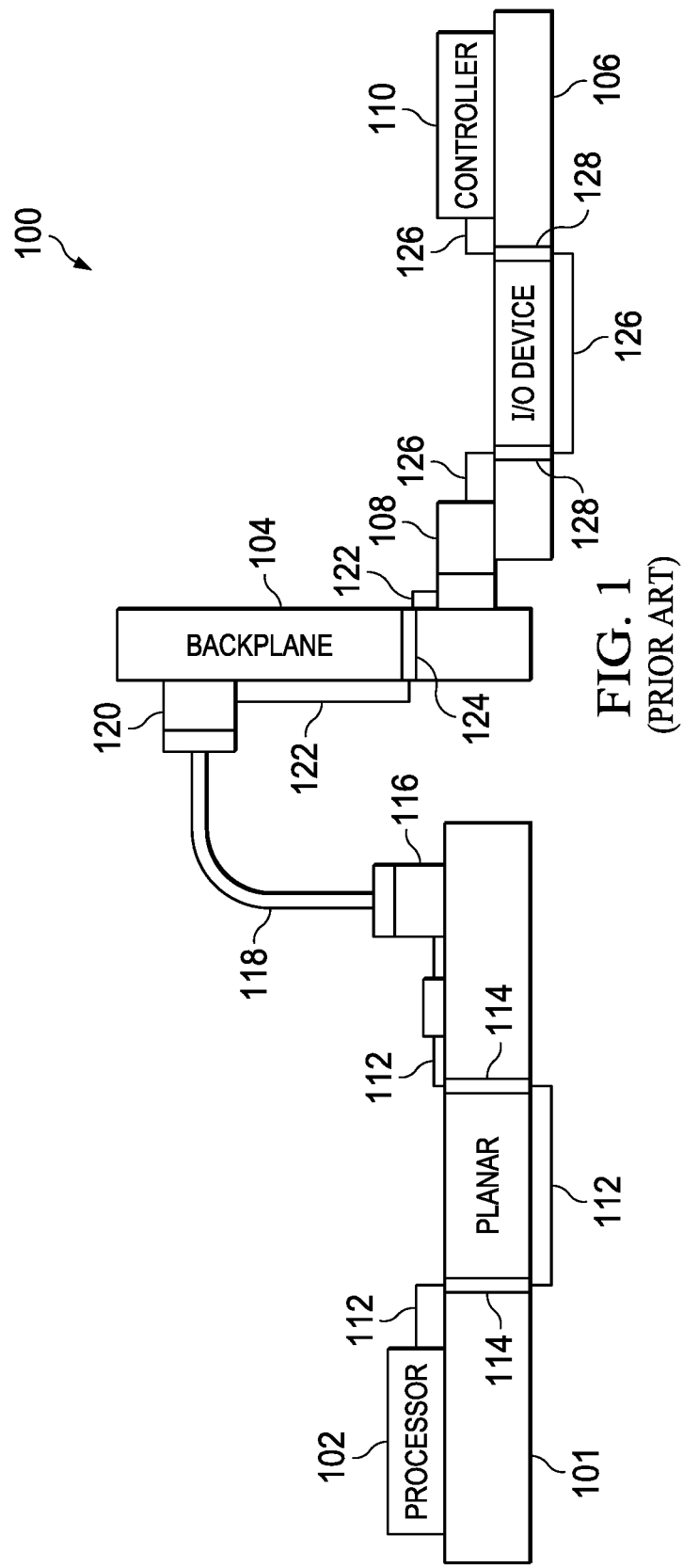
FIG. 1 illustrates a block diagram of selected components of an example information handling system, as is known in the art.

Preferred embodiments and their advantages are best understood by reference to FIGS. 1-5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs), etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

Figure 2:
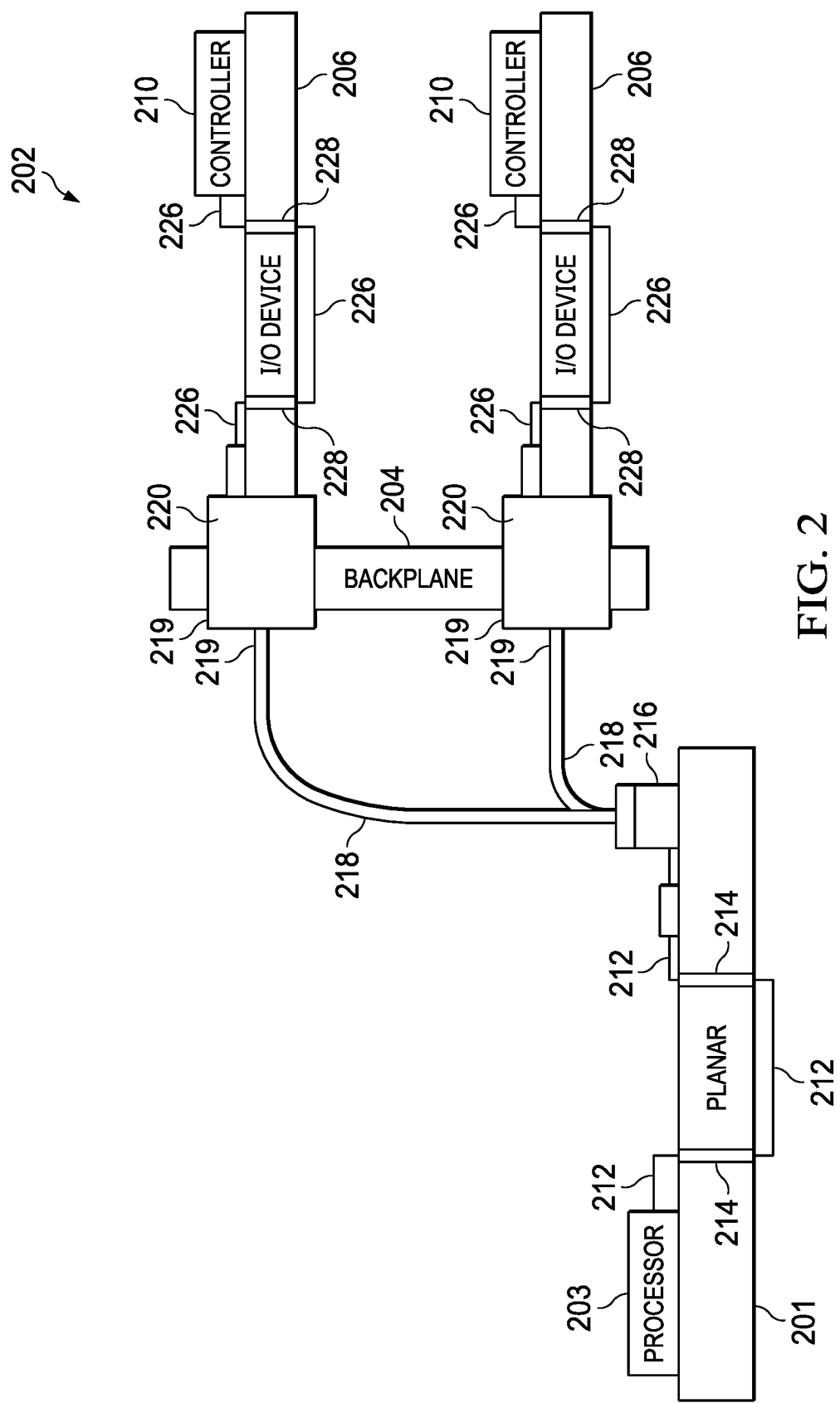
FIG. 2 illustrates a block diagram of selected components of an example information handling system, in accordance with embodiments of the present disclosure.

FIG. 2 illustrates a block diagram of selected components of an example information handling system 202. In some embodiments, information handling system 202 may comprise a server. In other embodiments, information handling system 202 may comprise networking equipment for facilitating communication over a communication network. In yet other embodiments, information handling system 202 may comprise a personal computer, such as a laptop, notebook, or desktop computer.

As shown in FIG. 2, information handling system 202 may include a planar 201 (e.g., a motherboard), a processor 203 mounted on and coupled to planar 201, a connector 216 (e.g., a x8 PCIe connector) mounted on and coupled to planar 201, one or more cable assemblies 219 each having a cable 218 and associated connector 220 (e.g., a x4 PCIe connector), a backplane 204 configured to electrically and mechanically couple to the one or more connectors 220, and one or more I/O devices 206 (e.g., PCIe solid state drives) configured to mechanically couple to a corresponding connector 220.

Planar 201 may comprise a circuit board configured to provide structural support for one or more information handling resources of information handling system 202 and/or electrically couple one or more of such information handling resources to each other and/or to other electric or electronic components external to information handling system 202. As shown in FIG. 2, planar 201 may comprise a plurality of electrical conduits for communicating signals and/or power among various components mounted thereto, including traces 212 and vias 214 for communicatively coupling processor 203 to connector 216.

Processor 203 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 203 may interpret and/or execute program instructions and/or process data stored in a storage resource, memory and/or another component of information handling system 202.

Connector 216 may comprise any system, device, or apparatus fixedly mounted on processor 203 and may be constructed to mechanically and electrically couple a cable 218 of a cable assembly 219 in order to electrically couple such cable assembly to processor 203, and/or other components of information handling system 202. Connector 216 may include a receptacle slot or other opening configured to removably receive a corresponding mating connector of cable 218.

I/O device 206 may comprise any suitable input/output device configured to communicate with processor 203, and may in some embodiments comprise one or more storage resources for storing data. As shown in FIG. 2, I/O device 206 may include a controller 210. Controller 210 may include any system, apparatus, or device (e.g., a storage controller) operable to manage the communication of data between processor 203 and I/O device 210. Also as shown in FIG. 2, I/O device 206 may comprise a plurality of electrical conduits for communicating signals and/or power among various components mounted thereto, including traces 226 and vias 228 for communicatively coupling controller 219 to connector 220.

Backplane 204 may comprise any system, device, or apparatus configured to provide power and/or sideband signals to connector 220 and may comprise one or more receptacles (not depicted in FIG. 2 but depicted in FIGS. 3-5), each receptacle configured to receive corresponding a connector (e.g., an edge connector) of an I/O device 206 in order to mechanically couple and maintain such I/O device 206 to backplane 204 such that such I/O device 206 electrically couples to connector 220. Such features are described in greater detail below with reference to FIGS. 3-5.

As shown in FIG. 2 and mentioned above, cable assembly 219 may comprise a cable 218 terminated at one end with a connector configured to mate with connector 216 of planar 201 and terminated at its other end with a connector 220. As described in greater detail with respect to FIGS. 3-5 below, such connector 220 may be a hybrid connector having a board-to-board portion for coupling electrical conduits of backplane 204 to I/O device 206 and a cable-to-board portion for coupling electrical conduits within cable 218 to I/O device 206.

In addition to planar 201, processor 203, backplane 204, I/O device 206, and cable assembly 219, information handling system 202 may include one or more other information handling resources.

Figure 3:
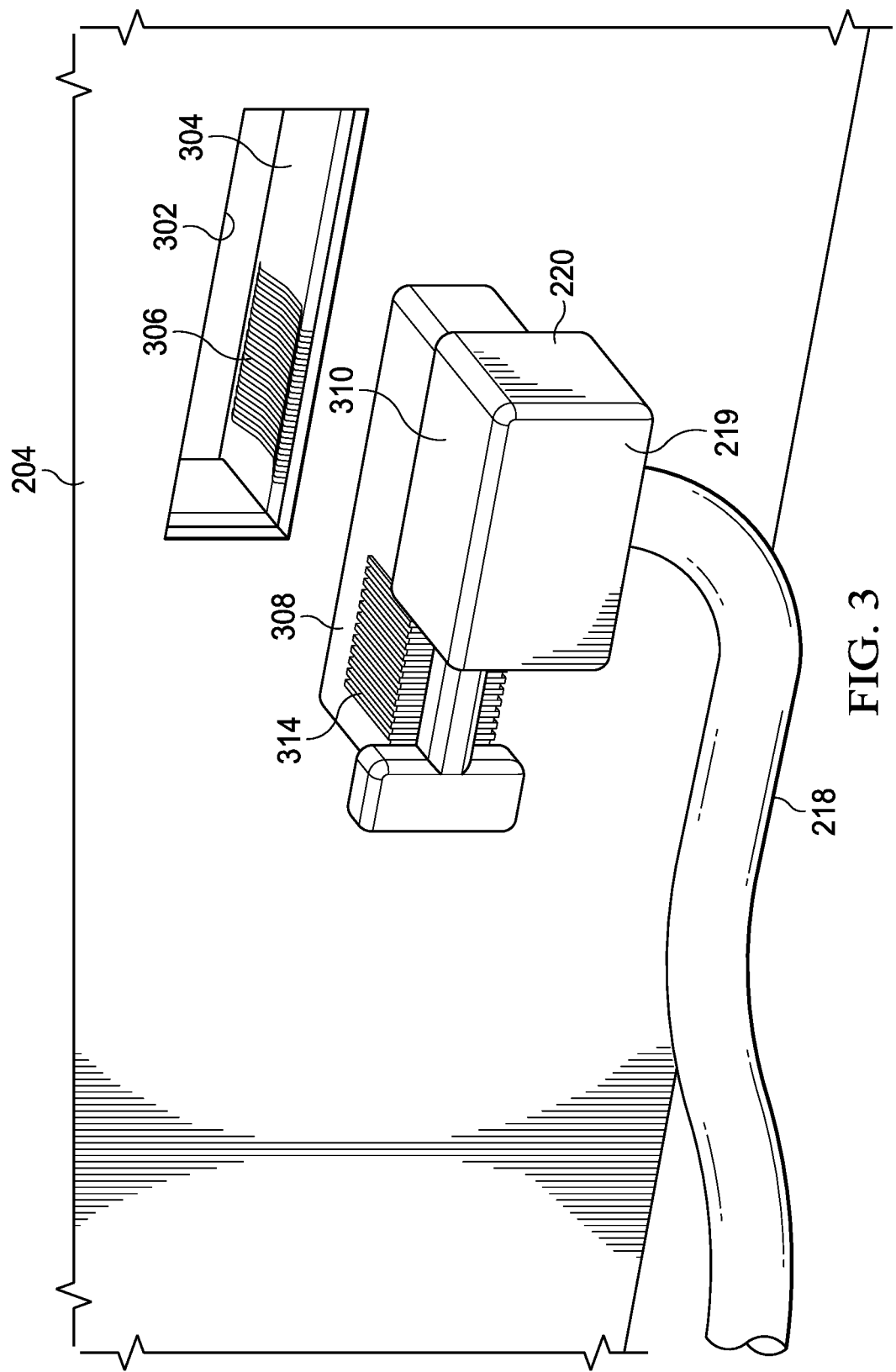
FIG. 3 illustrates a perspective view of a cable assembly and backplane of the information handling system depicted in FIG. 2 with the cable assembly decoupled from the backplane, in accordance with embodiments of the present disclosure.
Figure 4:
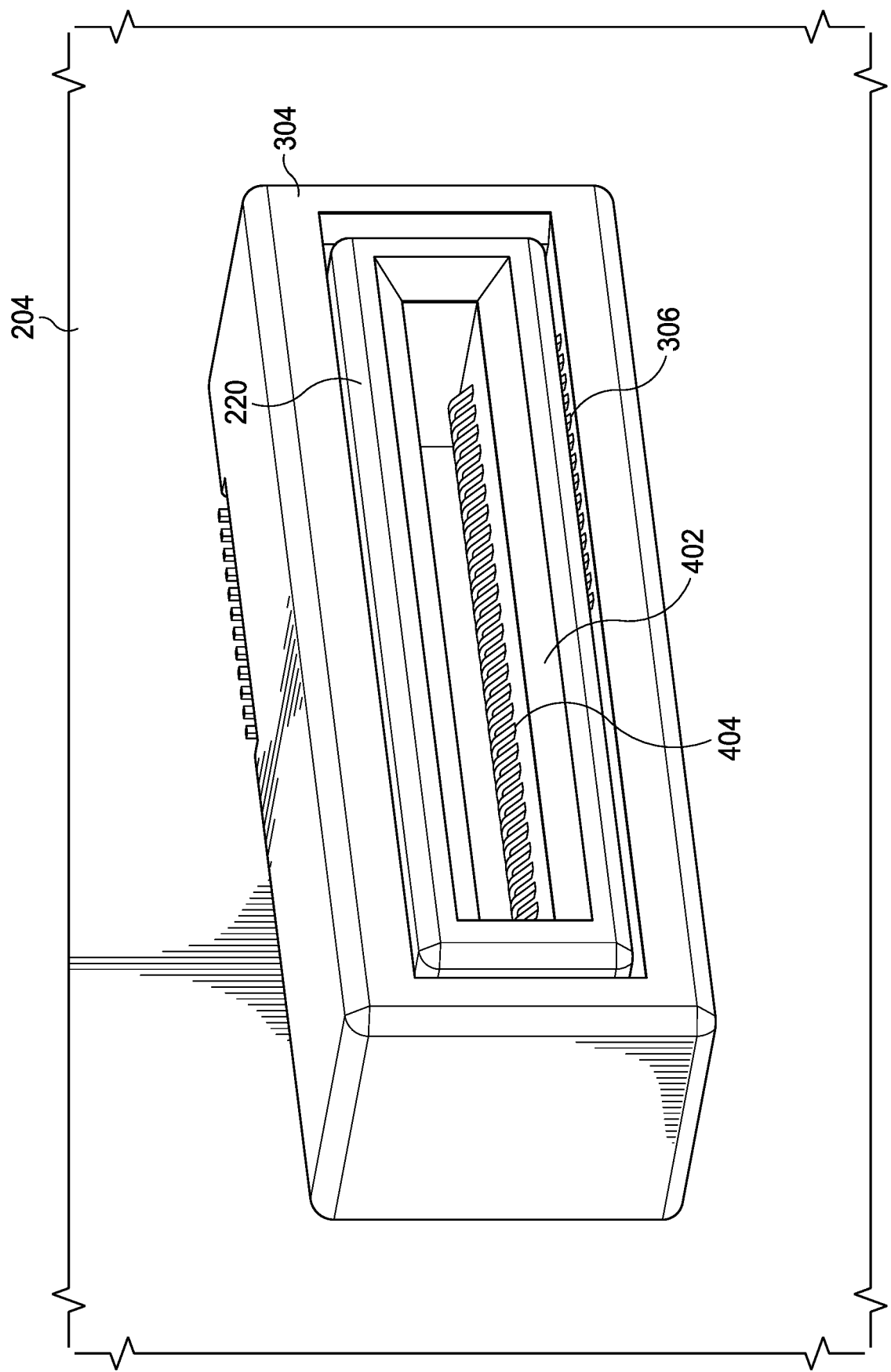
FIG. 4 illustrates a perspective view of a cable assembly and backplane of the information handling system depicted in FIG. 2 from the opposite side of the backplane than that shown in FIG. 3 and with the cable assembly coupled to the backplane, in accordance with embodiments of the present disclosure.

FIG. 3 illustrates a perspective view of cable assembly 219 and backplane 204 with cable assembly 219 decoupled from backplane 204, in accordance with embodiments of the present disclosure. FIG. 4 illustrates another perspective view of cable assembly 219 and backplane 204 from the opposite side of backplane 204 than that shown in FIG. 3 and with cable assembly 219 coupled to backplane 204, in accordance with embodiments of the present disclosure. As shown in FIGS. 3 and 4, backplane 204 may have an opening 302 through which connector 220 may partially pass. A jacket 304 may be mounted within opening 302 and on a surface of backplane 204 (e.g., on the side shown in FIG. 4). As shown in FIGS. 3 and 4, receptacle 402 may have formed therein pins 306 which may be electrically coupled to other electrical conduits of backplane 204, wherein such pins 306 may be configured to carry electrical power for powering an I/O device 206 and/or carry low-speed signals, such as sideband signals.

In operation, opening 302 and jacket 304 may be configured to mechanically mate and retain connector 220 within such jacket 304 such that a receptacle 402 of connector 220 is presented in to which I/O device 206 (e.g., via an edge connector of such I/O device 206) may be inserted into receptacle 402 of connector 220 to electrically couple electrical conduits of I/O device 206 to pins 404 within receptacle 402 of connector 220.

As shown in FIG. 3, connector 220 may have a power/sideband section 308 and a data section 310. Power/sideband section 308 may include a plurality of pins 314 each configured to, when connector 220 is engaged within opening 302, couple to a corresponding pin 306 within jacket 304 and couple to a corresponding pin 404 within receptacle 402. Thus, power/sideband section 308 may enable connectivity of power and/or low-speed signals between backplane 204 and an I/O device 206 via an electrical channel formed among pins 306, pins 314, and a portion of pins 404 apportioned to power and/or low-speed signals.

On the other hand, data section 310 may comprise a direct termination of data transmission wires of cable 218 into corresponding pins 404 which are apportioned for data communication. Accordingly, pins 404 may include both power/low-speed pins 404 and high-speed data pins 404, wherein: (i) power/low-speed pins 404 may be electrically coupled to electrical conduits of backplane 204, and such power/low-speed pins 404 may be configured to deliver power to I/O device 206 and carry low-speed signals to and from I/O device 206; and (ii) high-speed data pins 404 may be ultimately coupled to processor 203 via a channel comprising cable assembly 219, connector 216, and electrical conduits of planar 201.

Figure 5:
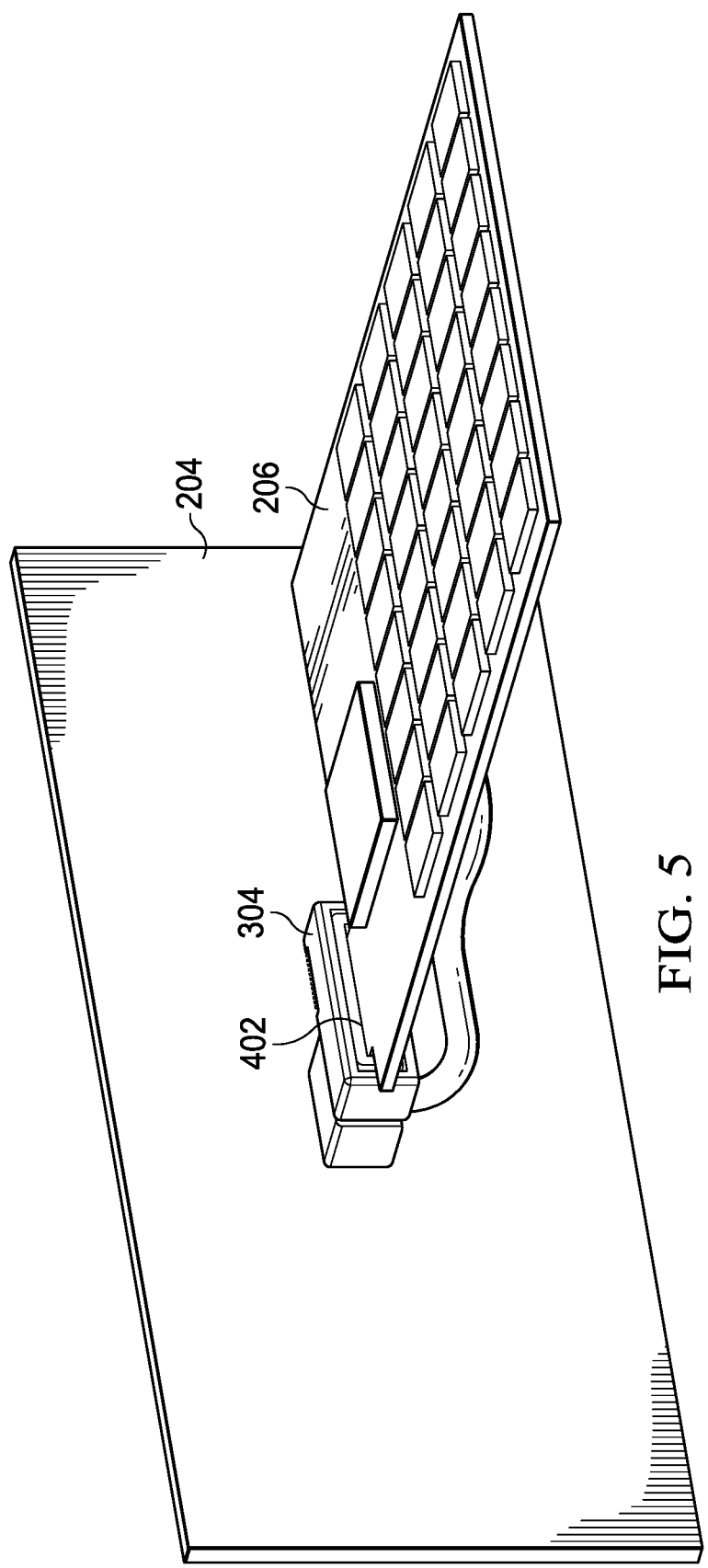
FIG. 5 illustrates a perspective view of a cable assembly and backplane similar to that shown in FIG. 4 with an input/output device inserted into a connector of the cable assembly, in accordance with embodiments of the present disclosure.

FIG. 5 illustrates a perspective view of cable assembly 219 and backplane 204 similar to the view shown in FIG. 4, instead with I/O device 206 inserted into receptacle 402 of cable assembly 219, in accordance with embodiments of the present disclosure.

Accordingly, using the systems and methods disclosed above, data section 310 of cable assembly 219 is more directly coupled to I/O device 206 as compared to the existing approach described in the Background section of this application. Accordingly, the data channel between processor 203 and I/O device 206 may be significantly shorter than that between processor 103 and I/O device 106 described in the Background section. For example, while the data channel of the approach in the Background section included traces 122 and vias 124 of planar 101 as well as three connectors (116, 120, and 108), the data channel depicted in FIGS. 2-5 may not require use of any electrical conduits (e.g., traces and vias) of backplane 204, and may enable use of fewer connectors (e.g., no analog to connector 108 is needed in the embodiments described with respect to FIGS. 2-5).

However, it may not be desirable to transmit power and sideband/low-speed signals through cable 218. Accordingly, using the systems and methods disclosed above, cable assembly 219 may include power/sideband section 308 configured to transmit power and low-power signals between backplane 204 and I/O device 206 while still presenting a single receptacle 402 for coupling high-speed data, low-speed data, and power to I/O device 206. Cable assembly 219 thus presents a single hybrid interface which simultaneously provides both board-to-board electrical coupling and cable-to-board electrical coupling. In some embodiments, such interface may be a form factor in accordance with an industry standard for I/O communication.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A cable assembly comprising:
    a cable comprising a plurality of electrically-conductive wires; and
    a hybrid connector that terminates an end of the cable, the hybrid connector comprising:
        a receptacle comprising a plurality of receptacle pins, and configured to:
            mechanically couple to a printed circuit board; and
            receive an electronic device in order to mechanically couple the electronic device to the receptacle and the printed circuit board and electrically couple each of a plurality of electronic device pins of the electronic device to respective ones of the plurality of receptacle pins;
        a first section that electrically couples each of the plurality of electrically-conductive wires to respective ones of the plurality of receptacle pins; and
        a second section that electrically couples each of a plurality of electrical conduits integral to the printed circuit board to respective ones of the plurality of receptacle pins;
    wherein the hybrid connector is configured to mechanically couple to the printed circuit board at an opening formed in the printed circuit board.

2. The cable assembly of claim 1, wherein the plurality of electrical conduits integral to the printed circuit board comprise at least one electrical conduit for transmitting power to the electronic device.

3. The cable assembly of claim 1, wherein the plurality of electrical conduits integral to the printed circuit board comprise at least one electrical conduit for transmitting signals at a speed significantly lower than signals transmitted over the cable.

4. The cable assembly of claim 1, wherein the electronic device comprises an input/output device.

5. The cable assembly of claim 1, wherein the receptacle has a form factor in accordance with an industry standard for input/output communication.

6. A printed circuit board comprising:
    a plurality of electrical conduits integral to the printed circuit board;
    an opening through which a connector of a cable assembly can pass to expose a receptacle of the connector to an electronic device, wherein the receptacle comprises a first section that electrically couples each of a plurality of electrically-conductive wires of the cable assembly to respective ones of a plurality of receptacle pins of the cable assembly and a second section that electrically couples each of the plurality of electrical conduits integral to the printed circuit board to respective ones of the plurality of receptacle pins;

a mechanical retention feature configured to mechanically couple the connector to the printed circuit board to fix a position of the receptacle to allow it to receive the electronic device; and an electrical interface that electrically couples the plurality of electrical conduits integral to the printed circuit board to respective ones of the plurality of receptacle pins.

7. The printed circuit board of claim 6, wherein the plurality of electrical conduits integral to the printed circuit board comprise at least one electrical conduit for transmitting power to the electronic device.

8. The printed circuit board of claim 6, wherein the plurality of electrical conduits integral to the printed circuit board comprise at least one electrical conduit for transmitting signals at a speed significantly lower than signals transmitted over the cable.

9. The printed circuit board of claim 6, wherein the electronic device comprises an input/output device.

10. An information handling system comprising:
a printed circuit board comprising:
a plurality of electrical conduits integral to the printed circuit board; and
an opening formed in the printed circuit board;
a cable assembly comprising:
a cable comprising a plurality of electrically-conductive wires; and
a hybrid connector that terminates an end of the cable, the hybrid connector comprising:
a receptacle comprising a plurality of receptacle pins, and configured to:
mechanically couple to the printed circuit board; and
receive an electronic device in order to mechanically couple the electronic device to the receptacle and the printed circuit board and electrically couple each of a plurality of electronic device pins of the electronic device to respective ones of the plurality of receptacle pins;
a first section that electrically couples each of the plurality of electrically-conductive wires to respective ones of the plurality of receptacle pins; and
a second section that electrically couples each of the plurality of electrical conduits integral to the printed circuit board to respective ones of the plurality of receptacle pins;

wherein the hybrid connector is configured to mechanically couple to the printed circuit board at the opening.

11. The information handling system of claim 10, wherein the plurality of electrical conduits integral to the printed circuit board comprise at least one electrical conduit for transmitting power to the electronic device.

12. The information handling system of claim 10, wherein the plurality of electrical conduits integral to the printed circuit board comprise at least one electrical conduit for transmitting signals at a speed significantly lower than signals transmitted over the cable.

13. The information handling system of claim 10, wherein the electronic device comprises an input/output device.

14. The information handling system of claim 10, wherein the receptacle has a form factor in accordance with an industry standard for input/output communication.

15. The information handling system of claim 10, the printed circuit board further comprising an electrical interface that electrically couples the plurality of electrical conduits integral to the printed circuit board to respective ones of the plurality of receptacle pins.

16. An information handling system comprising:
a printed circuit board comprising:
a plurality of electrical conduits integral to the printed circuit board; and
a mechanical retention feature;
a cable assembly comprising:
a cable comprising a plurality of electrically-conductive wires; and
a hybrid connector that terminates an end of the cable, the hybrid connector comprising:
a receptacle comprising a plurality of receptacle pins, and configured to:
mechanically couple to the printed circuit board; and
receive an electronic device in order to mechanically couple the electronic device to the receptacle and the printed circuit board and electrically couple each of a plurality of electronic device pins of the electronic device to respective ones of the plurality of receptacle pins;
a first section that electrically couples each of the plurality of electrically-conductive wires to respective ones of the plurality of receptacle pins; and
a second section that electrically couples each of the plurality of electrical conduits integral to the printed circuit board to respective ones of the plurality of receptacle pins;
wherein the mechanical retention feature is configured to mechanically couple the hybrid connector to the printed circuit board to fix a position of the receptacle to allow it to receive the electronic device.

\* \* \* \* \*